(12) United States Patent
Morimoto

(10) Patent No.: US 8,269,898 B2
(45) Date of Patent: Sep. 18, 2012

(54) IMAGE PROCESSING APPARATUS

(75) Inventor: Masami Morimoto, Fuchu (JP)

(73) Assignee: Kabushiki Kaisha TOSHIBA, Tokyo (JP)

(*) Notice: Subject to any disclaimer, the term of this patent is extended or adjusted under 35 U.S.C. 154(b) by 1219 days.

(21) Appl. No.: 12/077,314

(22) Filed: Mar. 18, 2008

(65) Prior Publication Data

US 2008/0278632 A1    Nov. 13, 2008

(30) Foreign Application Priority Data

May 9, 2007 (JP) ................ 2007-124765

(51) Int. Cl.
*H04N 5/57* (2006.01)
(52) U.S. Cl. ........ 348/687; 348/688; 345/589; 382/168; 382/173
(58) Field of Classification Search .................. None
See application file for complete search history.

(56) References Cited

U.S. PATENT DOCUMENTS

| | | | |
|---|---|---|---|
| 6,567,427 B1* | 5/2003 | Suzuki et al. ............... | 370/535 |
| 7,102,637 B2* | 9/2006 | Chen ........................ | 345/426 |
| 7,652,673 B1* | 1/2010 | Rice et al. .................. | 345/582 |
| 2003/0107682 A1* | 6/2003 | Sono ......................... | 348/687 |
| 2007/0268534 A1* | 11/2007 | Duan et al. ................. | 358/520 |
| 2007/0285574 A1* | 12/2007 | Nobori ...................... | 348/581 |
| 2009/0074317 A1* | 3/2009 | Lee .......................... | 382/256 |
| 2009/0214121 A1* | 8/2009 | Yokokawa et al. .......... | 382/199 |

FOREIGN PATENT DOCUMENTS

| | | |
|---|---|---|
| JP | 2003-008898 A | 1/2003 |
| JP | 2003-502758 A | 1/2003 |
| JP | 2003-110934 A | 4/2003 |
| JP | 2004-165840 A | 6/2004 |
| JP | 2005-086772 A | 3/2005 |
| JP | 2005-130486 A | 5/2005 |
| JP | 2005-182232 A | 7/2005 |
| JP | 2007-507809 A | 3/2007 |

OTHER PUBLICATIONS

Whitacre et al., Use of Statistical Outlier Detection Method in Adaptive Evolutionary Algorithms, Jul. 2004, GECCO.*
Japanese Office Action dated Jul. 7, 2009 and English translation thereof issued in a counterpart Japanese Application No. 2007-124765.

* cited by examiner

*Primary Examiner* — Brian Pendleton
*Assistant Examiner* — Fernando Alcon
(74) *Attorney, Agent, or Firm* — Holtz, Holtz. Goodman & Chick, PC

(57) ABSTRACT

A brightness converting unit obtains brightness of each of the pixels. The low-resolution brightness image generating unit divides an image based on the input image signal into a plurality of domains, and obtains an average brightness of each of the domains, on the basis of the brightness obtained by the brightness converting unit. A high-resolution brightness image generating unit obtains brightness of each of the pixels included in the image based on the input image signal by weighting the average brightness obtained for each of the domains by a distance from a central portion of the domain. On the basis of the obtained brightness, the corrected gain lookup table determines a corrected gain, and the correcting unit corrects the input image signal.

8 Claims, 5 Drawing Sheets

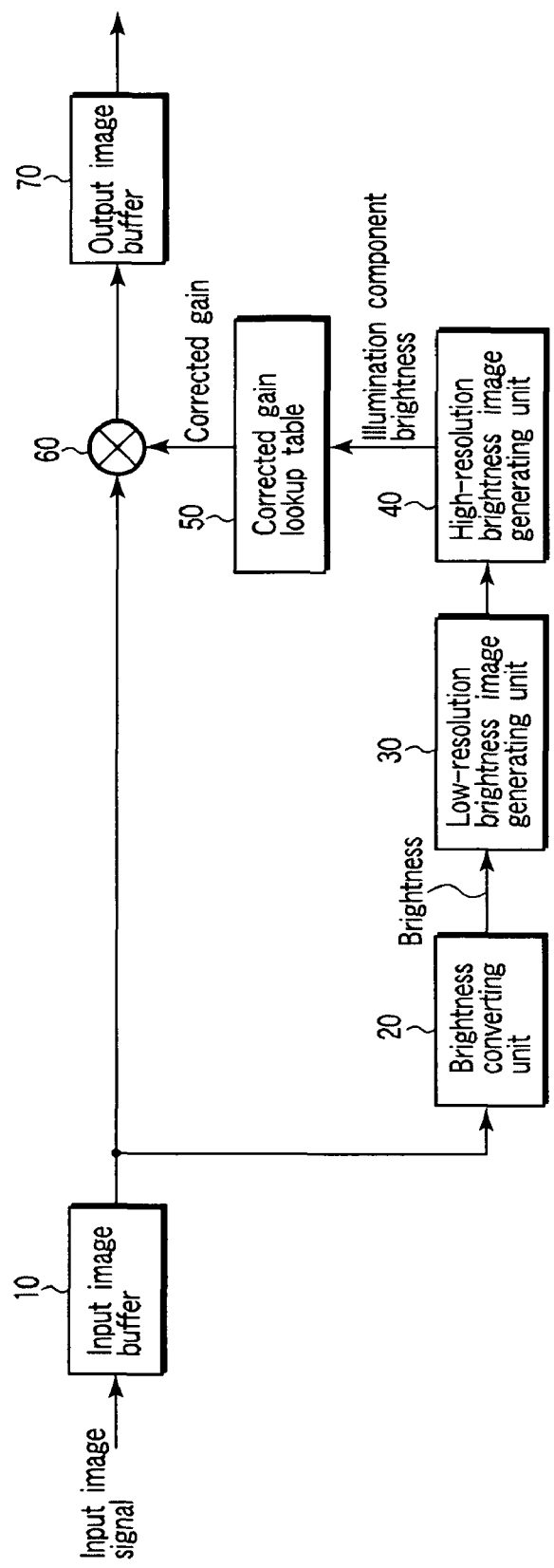
F I G. 1

IMAGE PROCESSING APPARATUS

CROSS-REFERENCE TO RELATED APPLICATIONS

This application is based upon and claims the benefit of priority from prior Japanese Patent Application No. 2007-124765, filed May 9, 2007, the entire contents of which are incorporated herein by reference.

BACKGROUND OF THE INVENTION

1. Field of the Invention

The present invention relates to an image processing apparatus configured to correct image data.

2. Description of the Related Art

By using single-scale Retinex algorithm for synthesizing enhanced images in which smoothed brightness components, edges and the like are extracted and enhanced, characteristics such as line segments, edges and the like in the images have been prevented from becoming small due to compression of the dynamic range (cf., for example, Jpn. Pat. Appln. KOKAI Publication No. 2005-182232).

When the image data is corrected in a system of separating the luminance into illumination components and contrast components by backlight correction or the like, subjecting the illumination components to dynamic range compression and synthesizing again the illumination components with the contrast components to correct the dark portion brightly, it is necessary to obtain peripheral illumination components by referring to alignment of the pixels in a wide range and correct the image data with a substantially constant gain, in order to maintain the local contrast.

However, since the illumination components are generally formed by a Gauss filter, a filter of large kernel size needs to be formed in order to obtain the illumination components of the pixels in a wide range. In consideration of an adequate range for maintenance of the contrast, the process amount becomes enormous.

If detection of the illumination components is executed in a narrow range, the images with no contrast are obtained since edges are crushed by regarding the variation in the luminance at the edge such as an object boundary or the like as the variation in the illumination components. Consequently, the separation cannot be sufficiently executed and the contrast cannot be saved.

The conventional image processing apparatus has a problem that a filter of large kernel size is required to obtain the illumination components of the pixels in a wide range and the process amount becomes enormous.

BRIEF SUMMARY OF THE INVENTION

The present invention has been accomplished to solve the above-described problems. The object of the present invention is to provide an image processing apparatus capable of implementing the dynamic range compression which restricts the process amount, extracts the illumination components in a wide range and maintains the contrast.

To achieve this object, an aspect of the present invention is an image processing apparatus, comprising: a brightness detecting unit which obtains brightness of each of pixels in an image based on an input image signal; an average brightness calculating unit which divides the image based on the input image signal to a plurality of domains and obtains an average brightness of each of the domains in accordance with brightness of the pixels in each of the domains; an illumination component brightness calculating unit which obtains an illumination component brightness of each of pixels of the image based on the input image signal, in accordance with the average brightness of the domain weighted by a distance from the domain including the pixel, and in accordance with the average brightness of the domain weighted by a distance from a domain in contact with the domain including the pixel; and a correcting unit which corrects a gain of each of the pixels in the image based on the input image signal, in accordance with the illumination component brightness obtained by the illumination component brightness detecting unit.

As described above, according to the present invention, the image based on the input image signal is divided into a plurality of domains, and an average brightness is obtained for each of the domains. The illumination component brightness is obtained for each of the pixels included in the image based on the input image signal, by weighting the average brightness obtained for each of the domains by a distance from the domain, and the gain of each of the pixels is corrected on the basis of the obtained illumination component brightness.

Therefore, according to the image processing apparatus having the above-described configuration, an ideal illumination component including no contrast component can be obtained at a small operation amount as compared with a conventional method of obtaining the illumination component by the Gauss filter for each pixel, and the image processing such as the dynamic range compression or the like can be executed while maintaining the contrast component of the input image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of an image processing apparatus according to an embodiment of the present invention;

DETAILED DESCRIPTION OF THE INVENTION

Figure 2:
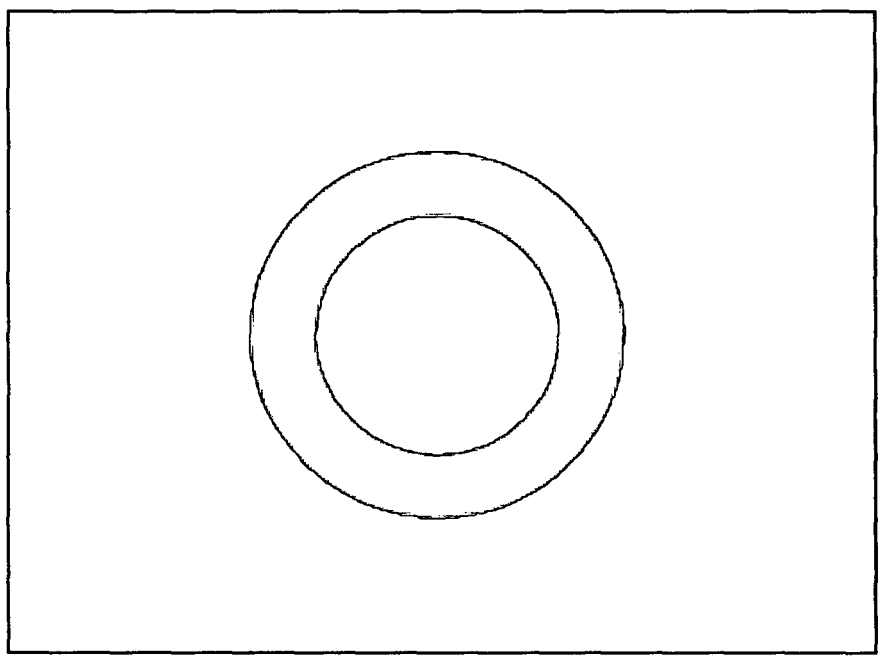
FIG. 2 is an illustration showing an original image to be input to the image processing apparatus shown in FIG. 1.

An embodiment of the present invention will be described with reference to the accompanying drawings.

FIG. 1 shows a configuration of an image processing apparatus, such as a cellular phone and a portable computer, according to the embodiment of the present invention. The image processing apparatus comprises an input image buffer 10, a brightness converting unit 20, a low-resolution brightness image generating unit 30, a high-resolution brightness image generating unit 40, a corrected gain lookup table 50, a correcting unit 60 and an output image buffer 70.

The input image buffer 10 temporarily buffers the input image signal input in the image processing apparatus to process the input image signal by the units at the subsequent stage. The input image signal temporarily buffered by the input image buffer 10 is output to the brightness converting unit 20 and the corrected gain lookup table 50.

The brightness converting unit 20 obtains the brightness of each of the pixels in the image from the input image signal and outputs the obtained brightness to the low-resolution brightness image generating unit 30. The brightness is closer to the luminous intensity which a person feels than the luminance value and can be defined variously. For example, the brightness is the maximum value of RGB.

The low-resolution brightness image generating unit 30 divides the image based on the input image signal into, for example, a plurality of latticed regions, and obtains an average brightness of each of the regions on the basis of the brightness of the pixels included in each region. The brightness of each of the regions is obtained by the brightness converting unit 20. Thus, an illumination component brightness image of low resolution can be obtained by considering the number of divided regions as the resolution.

Since the image of low resolution is regarded as the image of the illumination component which does not include the contrast component of the original image of high resolution, the dynamic range compression of the maintained contrast can be executed by executing the gain correction based on the image of the illumination component. For example, if the image based on the input image signal is an image as shown in FIG. 2, the average brightness of each of the regions can be obtained by the low-resolution brightness image generating unit 30. The regions are incorporated into a single image as shown in FIG. 3.

The high-resolution brightness image generating unit 40 obtains the illumination component brightness on the basis of the average brightness (i.e. the average brightness obtained by the low-resolution brightness image generating unit 30) of the region weighted by the distance from the central portion of the region where each of the pixels in the image based on the input image signal belongs, and the average brightness (i.e. the average brightness obtained by the low-resolution brightness image generating unit 30) of the region weighted by the distance from the central portion of the region which is in contact with the region where the pixel belongs.

Figure 3:
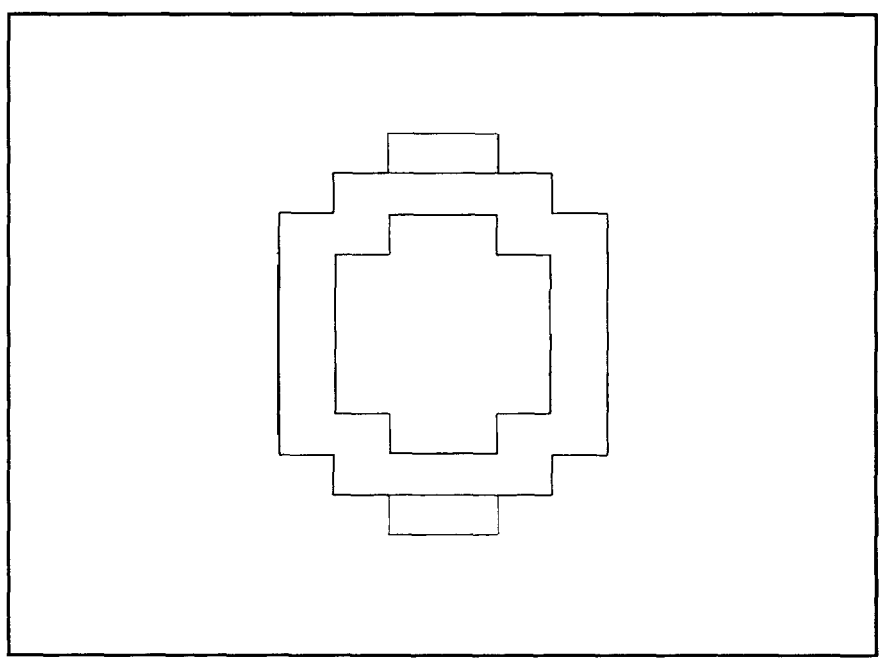
FIG. 3 is an illustration showing an average brightness in each region obtained by a low-resolution brightness image generating unit shown in FIG. 1.

For example, if the image based on the input image signal is the image shown in FIG. 2 and the average brightness shown in FIG. 3 is obtained by the low-resolution brightness image generating unit 30, the illumination component brightness of each of the pixels is obtained by the high-resolution brightness image generating unit 40. By assembling the pixels, the single image shown in FIG. 4 can be obtained.

Figure 4:
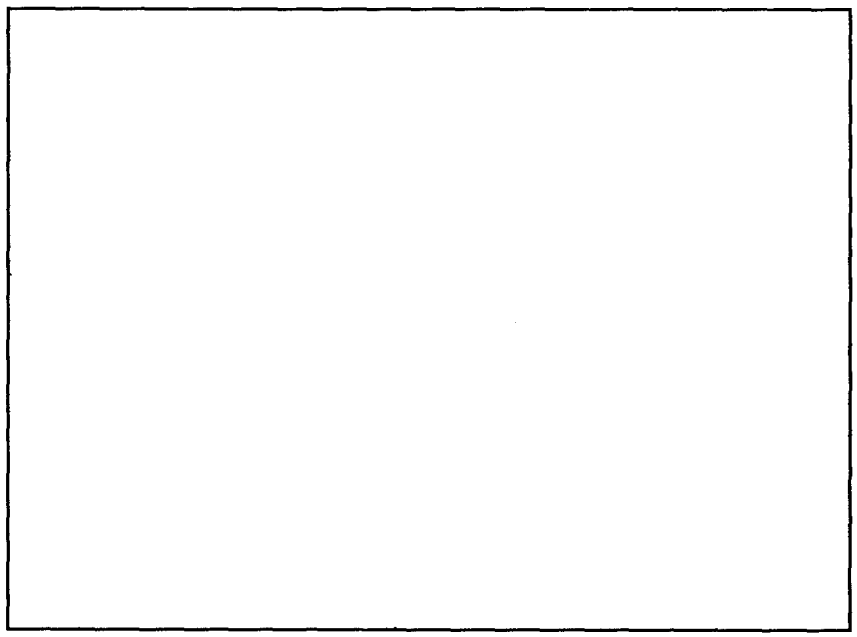
FIG. 4 is an illustration showing an illumination component brightness in each region obtained by a high-resolution brightness image generating unit shown in FIG. 1.

The illumination component brightness obtained by the high-resolution brightness image generating unit 40 will be explained with reference to FIG. 4. For simple explanation, the image based on the input image signal is divided into twelve. If the pixel of interest whose illumination component brightness is to be obtained is represented by P1, the pixel P1 belongs to region F1 and the region F1 is in contact with regions F2, F5, F6.

If inverses of distances between the pixel P1 and the centers of the regions F1, F2, F5, F6 are represented by r1, r2, r5, r6 (weights), respectively, and if the average brightnesses of the regions F1, F2, F5, F6 are represented by b1, b2, b5, b6, respectively, illumination component brightness B1 of the pixel P1 is represented by:

$$B1 = (r1 \times b1 + r2 \times b2 + r5 \times b5 + r6 \times b6)/a$$

where "a" represents the total weight:

$$a = r1 + r2 + r5 + r6.$$

Figure 6:
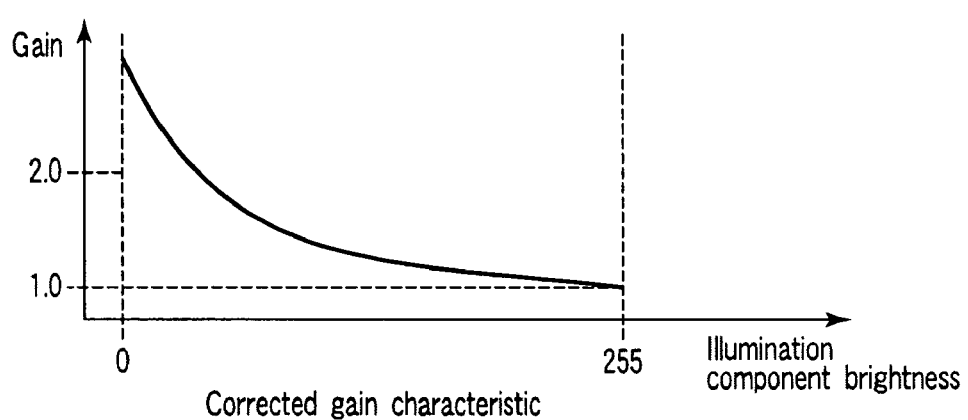
FIG. 6 is a graph showing properties of a corrected gain responsive table of a corrected gain lookup table unit shown in FIG. 1.

The corrected gain lookup table 50 converts the illumination component brightness of each of the pixels obtained by the high-resolution brightness image generating unit 40, into a corrected gain of each of the pixels, on the basis of a corrected gain responsive table having a characteristic shown in, for example, FIG. 6. The characteristic shown in FIG. 6 indicates that the gain is restricted in the pixel of high brightness and the gain becomes greater in the pixel of lower pixel. The dark portion is corrected to be bright while the bright portion is maintained. Since a color space of the input image is generally YCbCr or RGB, the corrected gain is applied to the luminance and color difference of each of the pixels when the corrected gain is YCbCr, and applied to RGB when the corrected gain is RGB.

Figure 7:
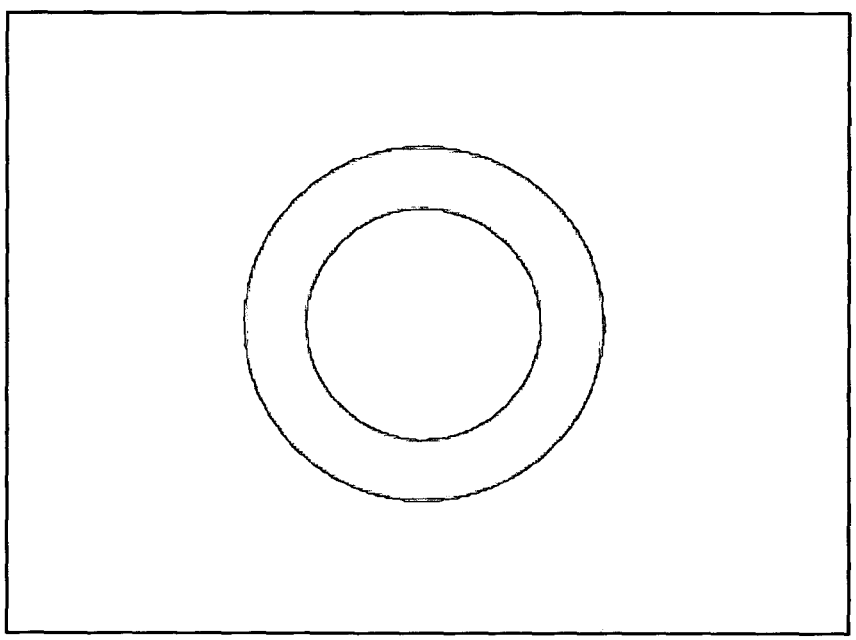
FIG. 7 is an illumination showing a corrected state of the original image shown in FIG. 2.

The correcting unit 60 corrects each of the pixels of the input image signal, by using the corrected gain of each of the pixels obtained by the corrected gain lookup table 50. If the image based on the input image signal is, for example, the image shown in FIG. 2, the image is corrected to an image shown in FIG. 7 by the correcting unit 60. In other words, since the illumination component brightness smoothly varied at the boundary of the background inside and outside the ring in the illustration, the background can be corrected brightly while maintaining the contrast at the boundary as seen in the amended image shown in FIG. 7.

The output image buffer 70 temporarily stores the signal of the image corrected by the correcting unit 60, and outputs the buffered image signal to a signal processing unit at the subsequent stage in accordance with an instruction from a control unit (not shown).

In the image processing apparatus having the above-described configuration, the image based on the input image signal is divided into a plurality of regions and the average brightness is obtained for each of the regions. The brightness is obtained by weighting the average brightness obtained for each region by the distance from the central portion of the region, for each of the pixels included in the image based on the input image signal, the corrected gain is determined on the basis of the obtained brightness, to correct the input image signal.

In other words, to obtain the corrected gain of the illumination component, the illumination component and the contrast component are not separate, but the pixel is preliminarily converted into the brightness, the brightness average value is obtained for each appropriate rectangular block, and the gain image of smooth variation is formed on the basis of the brightness average value and is applied to the original image. Thus, the gain correction is executed while maintaining the edge and contrast of the original image.

In other words, since the brightness in each block is first obtained, the number of times of evaluation on each pixel is reduced as compared with the moving average of the conventional Gauss filter and the illumination component can be obtained at a small process amount. Furthermore, the contrast component does not need to be preliminarily extracted for the purpose of storing the contrast.

Therefore, according to the image processing apparatus having the above-described configuration, an ideal illumination component including no contrast component can be obtained at a small operation amount as compared with a conventional method of obtaining the illumination component by the Gauss filter for each pixel, and the image processing such as the dynamic range compression or the like can be executed while maintaining the contrast component of the input image.

Figure 8:
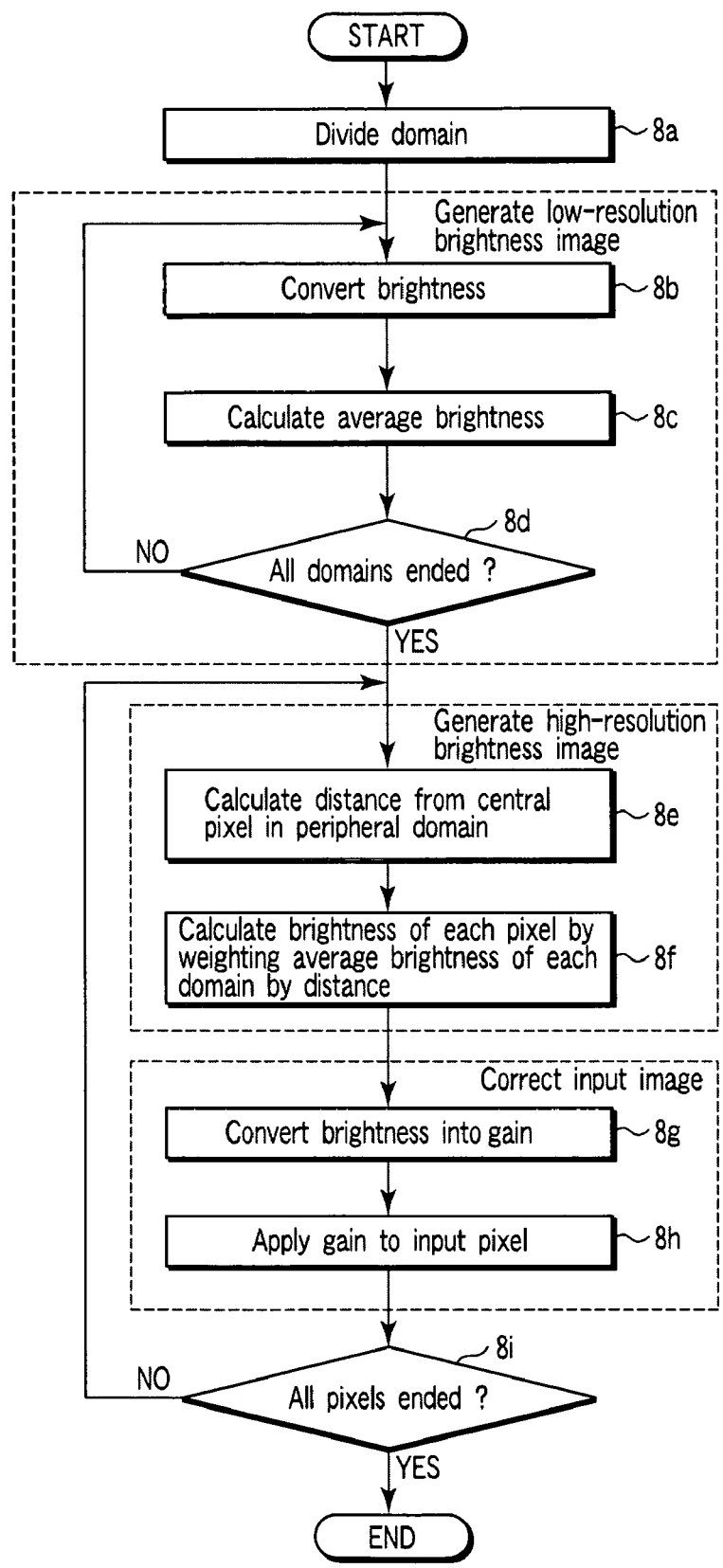
FIG. 8 is a flowchart showing operations in a case where the image processing apparatus of the present invention is constituted of a processor.

The above-described embodiment has been composed of a plurality of function blocks as shown in FIG. 1. However, the invention can also be implemented by a process of software employing, for example, a DSP (Digital Signal Process). FIG. 8 shows a flowchart employing a processor.

In the process shown in the flowchart, the processor first divides the image based on the input image signal into a plurality of areas in step 8a, and then proceeds to step 8b.

In step 8b, the processor obtains the brightness in each of pixels in a certain area. The processor proceeds to step 8c.

In step 8c, the processor obtains an average brightness of the area including the pixels, on the basis of the brightness in each of pixels obtained in step 8b. The processor proceeds to step 8d.

In step 8d, the processor discriminates whether the average brightness of all the areas is obtained. If the average brightness of all the areas is not obtained, the processor proceeds to step 8b to obtain the average brightness of remaining areas. If the average brightness of all the areas is obtained, the processor proceeds to step 8e.

By the process in steps 8a to 8d, the illumination component brightness image of a low resolution having the number of divided areas as the resolution can be obtained.

In step 8e, the processor obtains the distance from the central portion of the area including the pixel of interest whose illumination component brightness is to be required, and the distance from the central portion of the area which is in contact with the area including the pixel. The processor proceeds to step 8f.

In step 8f, the processor obtains the illumination component brightness of the pixel of interest in step 8e by weighting the average brightness of each of the areas whose distances are obtained in step 8e, by the obtained distance. The processor proceeds to step 8g.

By repeating steps 8e and 8f, a brightness image more blurred by weighting than the brightness image of low resolution can be obtained with the same resolution as that of the input image.

In step 8g, the processor obtains the corrected gain for compressing the dynamic range of the illumination component of the pixel of interest of step 8e, on the basis of the illumination component brightness obtained in step 8f.

In step 8h, the processor executes the gain correction by applying the corrected gain obtained in step 8g to the pixel of interest of step 8e in the input image signal. The processor proceeds to step 8i.

In step 8i, the processor discriminates whether or not the gain correction has been executed for all the pixels. If the gain correction has not been executed for all the pixels, the processor proceeds to 8e to correct the gain to obtain the corrected gain of the remaining pixels. If the gain correction has not been executed for all the pixels, the processor ends this process and starts the process for the pixel of the next frame.

As described above, the same advantage can also be obtained from the signal process by the processor.

In the above-described embodiment, the image based on the input image signal is divided into a plurality of area by the low-resolution brightness image generating unit 30 to obtain the average brightness of each of the areas. Instead of this, however, by preparing a reduced image of the image based on the input image signal, the brightness of each of the pixels included in the reduced image may be obtained as the average brightness or the average brightness may be obtained by using a plurality of pixels in the reduced image, and the average brightness may be used in the high-resolution brightness image generating unit 40. In this case, too, the operation amount can be reduced and the image processing such as the dynamic range compression or the like can be executed while maintaining the contrast component.

Figure 5:
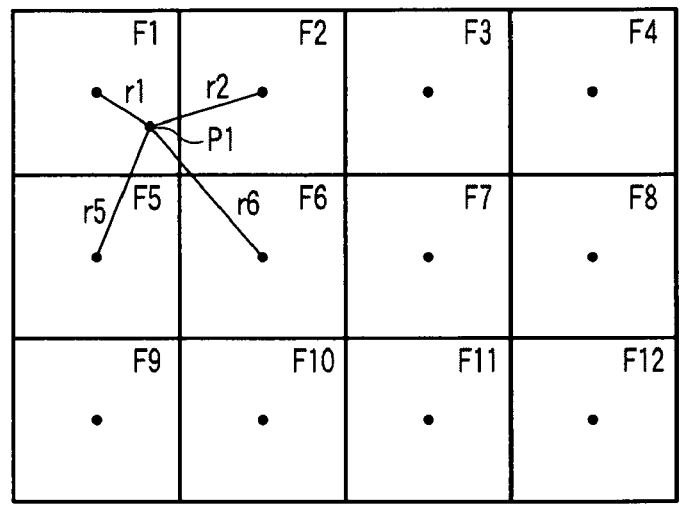
FIG. 5 is an illumination showing a process of the high-resolution brightness image generating unit shown in FIG. 1.

In addition, in the above-described embodiment, the image has been divided in one method ("3×4" in FIG. 5) by the low-resolution brightness image generating unit 30. Instead of this, however, the image may be divided into areas of plural sizes in, for example, two methods ("3×4", and "6×8") or three methods ("3×4", "6×8" and "9×12"), the average brightness of each of the areas may be obtained, and the average brightness of each area of a certain size may be obtained by synthesizing the obtained average brightnesses and used in the high-resolution brightness image generating unit 40. According to this, since a small shade that cannot be extracted in the area of a large size can be extracted, the illumination component of small accuracy variation can be obtained in accordance with the size of the object.

Then, the high-resolution brightness image generating unit 40 has obtained the illumination component brightness of each of the pixels, on the basis of the average brightness of the area of one size. Instead of this, however, the low-resolution brightness image generating unit 30 may obtain the average brightness of the areas of plural sizes, obtain the illumination component brightness of each of the pixels on the basis of the average brightness of the areas of plural sizes, and may average (synthesize) the results for each of the pixels. In this structure, too, since a small shade that cannot be extracted in the area of a large size can be extracted, the illumination component of small accuracy variation can be obtained in accordance with the size of the object.

Moreover, the illumination component brightness of each of the pixels obtained by the high-resolution brightness image generating unit 40 may be limited within a certain range about the brightness obtained by the brightness converting unit 20. More specifically, several methods can be conceived. For example, the illumination component brightness of each of the pixels output from the high-resolution brightness image generating unit 40 may be limited to a certain range about the brightness obtained by the brightness converting unit 20, the range of the corrected gain may be limited to a certain range about the brightness obtained by the brightness converting unit 20 when the illumination component brightness is converted into the corrected gain by the corrected gain lookup table 50, or the brightness obtained by the brightness converting unit 20 may be limited to a preset range and output.

According to this, adjustment for restricting occurrence of what is called "hallo" at the boundary portion of the shade can be executed. In addition, an effect of restricting whitening of black can be expected by setting not only the upper limit, but also the lower limit of the brightness.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image processing apparatus, comprising:
a brightness detector configured to detect a brightness of each of pixels in an image;
an average brightness calculator configured to divide the image into a plurality of domains and calculate an average brightness of each of the domains in accordance with the brightness of the pixels in each of the domains;
an illumination component brightness calculator configured to calculate an illumination component brightness of each of pixels of the image, in accordance with the average brightness of the domain weighted by a distance from the domain including the pixel, and in accordance with the average brightness of the domain weighted by a distance from a domain in contact with the domain including the pixel; and
a correcting module configured to correct a gain of each of the pixels in the image, in accordance with the illumination component brightness obtained by the illumination component brightness detector,
wherein the average brightness calculator is configured to (i) divide the image into domains of a first size and calculate a first average brightness of each of the domains in accordance with the brightness of a pixel included in each of the domains, (ii) divide the image into a plurality of domains of a second size different in magnitude from the first size and calculate a second average brightness of each of the domains in accordance with the brightness of a pixel included in each of the domains, and (iii) synthesize the first average brightness and the second average brightness and output the synthesized average brightness as the average brightness.

2. An image processing apparatus comprising:
a brightness detector configured to detect a brightness of each of pixels in an image;
an average brightness calculator configured to divide the image into a plurality of domains and calculate an average brightness of each of the domains in accordance with the brightness of the pixels in each of the domains;
an illumination component brightness calculator configured to calculate an illumination component brightness of each of pixels of the image, in accordance with the average brightness of the domain weighted by a distance from the domain including the pixel, and in accordance with the average brightness of the domain weighted by a distance from a domain in contact with the domain including the pixel; and
a correcting module configured to correct a gain of each of the pixels in the image, in accordance with the illumination component brightness obtained by the illumination component brightness detector,
wherein the average brightness calculator is configured to (i) divide the image into a plurality of domains of a first size and calculate a first average brightness of each of the domains in accordance with the brightness of a pixel included in each of the domains, (ii) divide the image based on the input image signal into a plurality of domains of a second size different in magnitude from the first size and obtain a second average brightness of each of the domains in accordance with the brightness of a pixel included in each of the domains, and
wherein the illumination component brightness calculator is configured to (i) calculate a first illumination component brightness of each of the pixels of the image, in accordance with the first average brightness of the domain weighted by the distance from the domain including the pixel, and in accordance with the first average brightness of the domain weighted by the distance from a domain in contact with the domain including the pixel, (ii) calculate a second illumination component brightness of each of the pixels of the image based on the input image signal, in accordance with the second average brightness of the domain weighted by the distance from the domain including the pixel, and in accordance with the second average brightness of the domain weighted by the distance from a domain in contact with the domain including the pixel, and (iii) synthesize the first illumination component brightness and the second illumination component brightness, of each of the pixels of the image and output the synthesized illumination component brightness as the illumination component brightness.

3. The apparatus according to claim 1, wherein the illumination component brightness calculator comprises a limiting module configured to limit the illumination component brightness of each of the pixels of the image, in a range based on the brightness of each of the pixels obtained by the brightness detector.

4. The apparatus according to claim 1, wherein the brightness detector is configured to detect the brightness of the pixels of the image, and limit the brightness beyond a preset range to brightness within the range and output the limited brightness.

5. The image processing apparatus according to claim 1, further comprising:
a reduced image generating unit which generates a reduced image of an original image;
wherein the average brightness detector is configured to detect the brightness of each of the pixels of the reduced image as the average brightness;
wherein the illumination component brightness calculator is configured to regard pixels of the original image corresponding to one pixel of the reduced image as one domain, and calculate an illumination component brightness of each of pixels of the original image, in accordance with the average brightness of the reduced image corresponding to the domain weighted by a distance from the domain including the pixel, and in accordance with the average brightness of the reduced image corresponding to the domain weighted by a distance from a domain in contact with the domain including the pixel; and
wherein the correcting module is configured to correct a gain of each of the pixels in the original image, in accordance with the illumination component brightness obtained by the illumination component brightness calculator.

6. The apparatus according to claim 2, wherein the illumination component brightness calculator comprises a limiting module configured to limit the illumination component brightness of each of the pixels of the image, in a range based on the brightness of each of the pixels obtained by the brightness detector.

7. The apparatus according to claim 2, wherein the brightness detector is configured to detect the brightness of each of the pixels of the image, and limit the brightness beyond a preset range to a brightness within the range and output the limited brightness.

8. The apparatus according to claim 2, further comprising:
a reduced image generating unit which generates a reduced image of an original image;
wherein the average brightness detector is configured to detect the brightness of each of the pixels of the reduced image as an average brightness;
wherein the illumination component brightness calculator is configured to regard pixels of the original image corresponding to one pixel of the reduced image as one domain, and to calculate an illumination component brightness of each of pixels of the original image, in accordance with the average brightness of the reduced image corresponding to the domain weighted by a distance from the domain including the pixel, and in accordance with the average brightness of the reduced image corresponding to the domain weighted by a distance from a domain in contact with the domain including the pixel; and
wherein the correcting module is configured to correct a gain of each of the pixels in the original image, in accordance with the illumination component brightness obtained by the illumination component brightness calculator.

* * * * *